(12) United States Patent
Masakawa

(10) Patent No.: US 8,800,128 B2
(45) Date of Patent: Aug. 12, 2014

(54) WORKPIECE CLAMPING JIG AND WORKPIECE MACHINING METHOD USING WORKPIECE CLAMPING JIG

(71) Applicant: Fanuc Corporation, Yamanashi (JP)

(72) Inventor: Takashi Masakawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 20 days.

(21) Appl. No.: 13/726,325

(22) Filed: Dec. 24, 2012

(65) Prior Publication Data
US 2013/0239401 A1    Sep. 19, 2013

(30) Foreign Application Priority Data
Mar. 14, 2012    (JP) ................................. 2012-056762

(51) Int. Cl.
*B23Q 3/06* (2006.01)
*B25B 11/00* (2006.01)

(52) U.S. Cl.
CPC .................................. *B25B 11/005* (2013.01)
USPC .................... 29/464; 29/557; 29/559; 269/21; 269/303

(58) Field of Classification Search
CPC ................................................... B25B 11/005
USPC .............. 29/465, 557, 559; 269/21, 303, 304
See application file for complete search history.

(56) References Cited

U.S. PATENT DOCUMENTS

2007/0063402 A1    3/2007    Soyama

FOREIGN PATENT DOCUMENTS

| CN | 1750917 A | 3/2006 |
|---|---|---|
| CN | 201455699 U | 5/2010 |
| JP | 5791530 U | 11/1955 |
| JP | 1170530 U | 12/1989 |
| JP | 27932 U | 1/1990 |
| JP | 10022365 A | 1/1998 |
| JP | 2000-126960 A | 5/2000 |
| JP | 2005230946 A | 9/2005 |
| JP | 2010017799 A | 1/2010 |

OTHER PUBLICATIONS

Notification of Reasons for Refusal for Patent Application No. 2012-056762 dispatched Mar. 12, 2013.
Office Action issued Apr. 9, 2014, corresponds to Chinese patent application No. 201310080250.6.

*Primary Examiner* — Jermie Cozart
(74) *Attorney, Agent, or Firm* — Lowe Hauptman & Ham, LLP

(57) ABSTRACT

A workpiece clamping jig configured to clamp a workpiece is provided with a baseplate, a fixed abutting member, and a movable abutting member. The baseplate has a pocket, which forms an air intake passage on the reverse side of a workpiece mounting surface, and a suction through-hole internally connecting the workpiece mounting surface and the pocket. The fixed abutting member is disposed on the baseplate and has a fixed abutting surface corresponding to the shape of the workpiece, and the movable abutting member has an abutting surface movable relative to the workpiece caused to abut against the fixed abutting surface of the fixed abutting member.

3 Claims, 4 Drawing Sheets

WORKPIECE CLAMPING JIG AND WORKPIECE MACHINING METHOD USING WORKPIECE CLAMPING JIG

RELATED APPLICATIONS

The present application is based on, and claims priority from, Japanese Application Number 2012-056762, filed Mar. 14, 2012, the disclosure of which is hereby incorporated by reference herein in its entirety.

BACKGROUND OF THE INVENTION

1. Field of the Invention

The present invention relates to a workpiece clamping jig and a workpiece machining method using the workpiece clamping jig.

2. Description of the Related Art

Conventionally, jigs configured to hold workpieces by suction and attachment jigs for clamping workpieces are used as workpiece clamping jigs, besides mechanical clamping jigs, such as a stock vice. Since these attachment devices are susceptible to the problem of deflection or deformation of workpieces caused by mechanical clamping, they are often used to clamp thin-walled workpieces. Conventional attachment methods are based on vacuum suction or magnetic attraction (for magnetic workpieces). In vacuum suction jigs, vacuum suction is performed by applying negative pressure to a workpiece by means of a suction device such as a vacuum pump and suction through-holes in a workpiece mounting surface of the jig. One example of such a vacuum suction jig is disclosed in Japanese Patent Application Laid-Open No. 2000-126960.

The vacuum suction jig of Japanese Patent Application Laid-Open No. 2000-126960 described above is designed so that the suction through-holes in the workpiece mounting surface need not be separately closed even though the suction holes are located outside the attachment surface of the workpiece. In this jig, a slidable presser plate laterally holds and fixes the workpiece.

The performance of the vacuum suction jig disclosed in Japanese Patent Application Laid-Open No. 2000-126960 is based on a combination of mechanical clamping of side surface portions of the workpiece and vacuum holding of a bottom surface portion of the workpiece. Since the surface roughness and flatness of an attachment surface and abutting surfaces of the jig and the perpendicularity between the surfaces are not ensured, however, the bottom surface of the workpiece may possibly be lifted by mechanical clamping. The vacuum suction jig for use as a cutting jig is intended to bring the workpiece into close contact with the workpiece mounting surface, thereby preventing the bottom surface portion of the workpiece from being plastically deformed or caused to vibrate by machining load. Therefore, it is important to ensure close contact between the bottom surface of the workpiece and the workpiece mounting surface of the jig.

SUMMARY OF THE INVENTION

Accordingly, the object of the present invention is to provide a workpiece clamping jig and a workpiece machining method using the workpiece clamping jig such that a workpiece is brought into close contact with a workpiece mounting surface and a bottom surface portion of the workpiece can be prevented from being plastically deformed or caused to vibrate by machining load.

A workpiece clamping jig according to the present invention, configured to clamp a workpiece, comprises a baseplate comprising a workpiece mounting surface carrying the workpiece on the top thereof, a pocket which forms an air intake passage on the reverse side of the workpiece mounting surface, and a suction through-hole internally connecting the workpiece mounting surface and the pocket, a fixed abutting member disposed on the baseplate and comprising a fixed abutting surface corresponding to the shape of the workpiece, and a movable abutting member comprising an abutting surface movable relative to the workpiece caused to abut against the fixed abutting surface.

In a workpiece machining method using the workpiece clamping jig according to the present invention, machining is performed on a workpiece held by vacuum suction and clamped by the workpiece clamping jig. A first aspect of the workpiece machining method includes a step of setting the baseplate on a vacuum suction table set on a table of a machine tool, a step of machining the workpiece mounting surface of the baseplate by means of the machine tool, a step of installing the fixed abutting member and the movable abutting member on the baseplate, a step of machining the respective abutting surfaces of the fixed and movable abutting members by means of the machine tool, a step of setting the workpiece on the workpiece mounting surface and clamping the workpiece by means of the fixed and movable abutting members, and a step of machining the clamped workpiece.

Further, a second aspect of the workpiece machining method using the workpiece clamping jig includes a step of setting the baseplate on a vacuum suction table set on a table of a machine tool, a step of installing the fixed abutting member and the movable abutting member on the baseplate, a step of machining the workpiece mounting surface of the baseplate and the respective abutting surfaces of the fixed and movable abutting members by means of the machine tool, a step of setting the workpiece on the workpiece mounting surface and clamping the workpiece by means of the fixed and movable abutting members, and a step of machining the clamped workpiece.

According to the present invention, there can be provided a workpiece clamping jig and a workpiece machining method using the workpiece clamping jig such that a workpiece is brought into close contact with a workpiece mounting surface and a bottom surface portion of the workpiece can be prevented from being plastically deformed or caused to vibrate by machining load.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
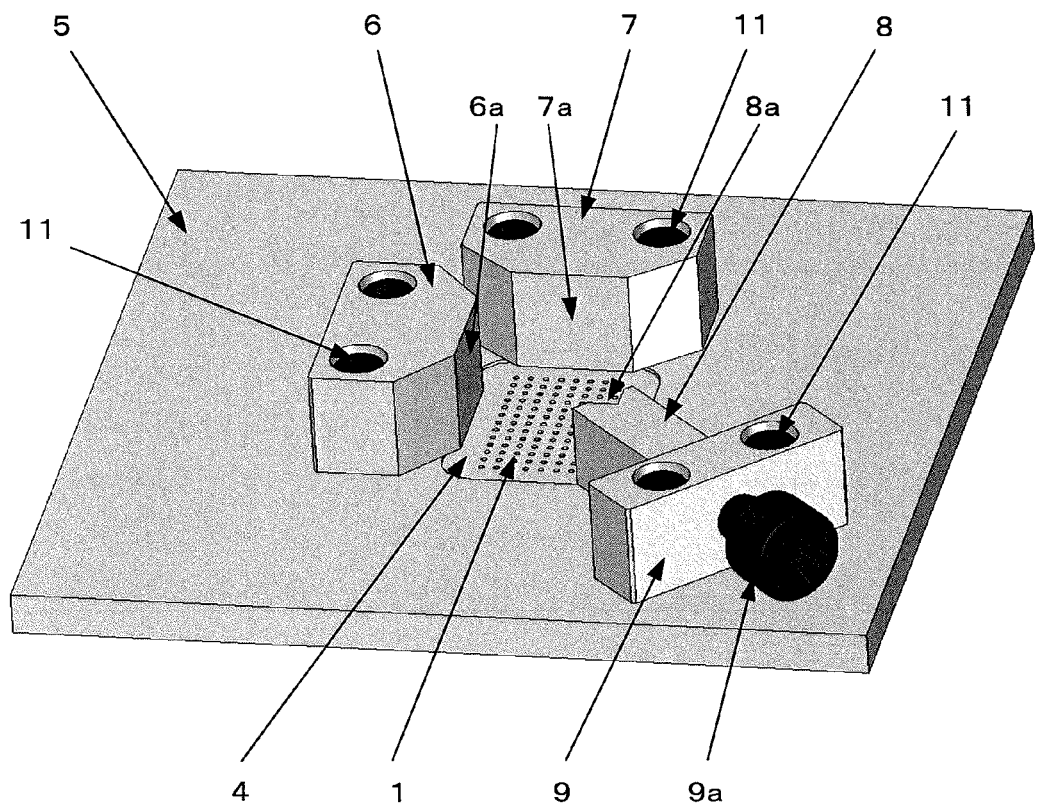
FIG. 1 is a perspective view illustrating a workpiece clamping jig without a workpiece thereon.
Figure 2:
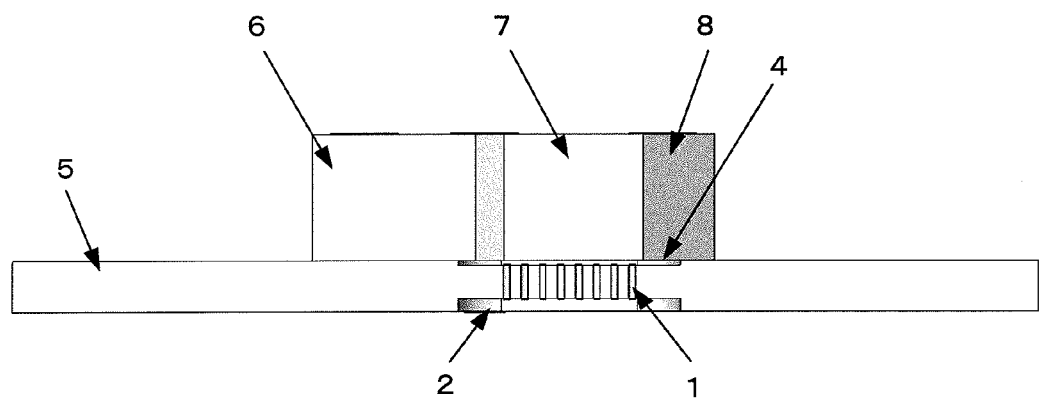
FIG. 2 is a partial sectional view illustrating the workpiece clamping jig shown in FIG. 1.

One embodiment of a workpiece clamping jig according to the present invention will now be described with reference to FIG. 1 (perspective view showing the workpiece clamping jig without a workpiece thereon) and FIG. 2 (partial sectional view of the workpiece clamping jig of FIG. 1).

The workpiece clamping jig comprises a baseplate 5, one or more fixed abutting members, and a movable workpiece-abutting member 8. One surface of the baseplate 5 serves as a workpiece mounting surface 4, while the other surface is formed with a pocket 2 that serves as an air intake passage. Further, the baseplate 5 is formed with a plurality of suction through-holes 1 that internally connect the workpiece mounting surface 4 and the pocket. The fixed abutting members include first and second fixed workpiece-abutting members 6 and 7 disposed on the baseplate 5. The first and second fixed workpiece-abutting members 6 and 7 each have a fixed abutting surface corresponding to the shape of the workpiece. The movable workpiece-abutting member 8 has an abutting surface movable relative to the workpiece on the workpiece mounting surface 4.

The baseplate 5, which is secured by bolts 12 to a vacuum suction table 13 set on a table 15 (FIG. 3) of a machine tool, comprises the workpiece mounting surface 4 carrying the workpiece 3 on its top, the pocket 2 that forms the air intake passage on the reverse side of the mounting surface 4, and the suction through-holes 1 that internally connect the workpiece mounting surface 4 and the pocket 2. The pocket 2 is a space through which the suction through-holes 1 communicate with an air intake port 14 (described later) of the vacuum suction table.

First and second fixed workpiece-abutting members 6 and 7 having fixed abutting surfaces 6a and 7a, respectively, corresponding to the shapes of side surfaces of the workpiece 3 are secured to the surface of the baseplate 5 by two pairs of bolts 11, individually. As shown in FIG. 1, the first and second fixed workpiece-abutting members 6 and 7 are secured to the surface of the baseplate 5 so that extensions of their fixed abutting surfaces 6a and 7a cross each other.

Further, abutting means 9 for moving the movable workpiece-abutting member 8 having a movable abutting surface 8a is secured to the surface of the baseplate 5 by two bolts 11. The movable workpiece-abutting member 8 is moved relative to the abutting means 9 by pivoting a screw 9a attached to the abutting means 9. The movable workpiece-abutting member 8 may alternatively be moved using another means than the screw 9a. As shown in FIG. 1, the movable abutting surface 8a is formed of two flat surfaces between which an acute angle is formed. A flank may be machined at the position where these two surfaces cross each other.

Figure 3:
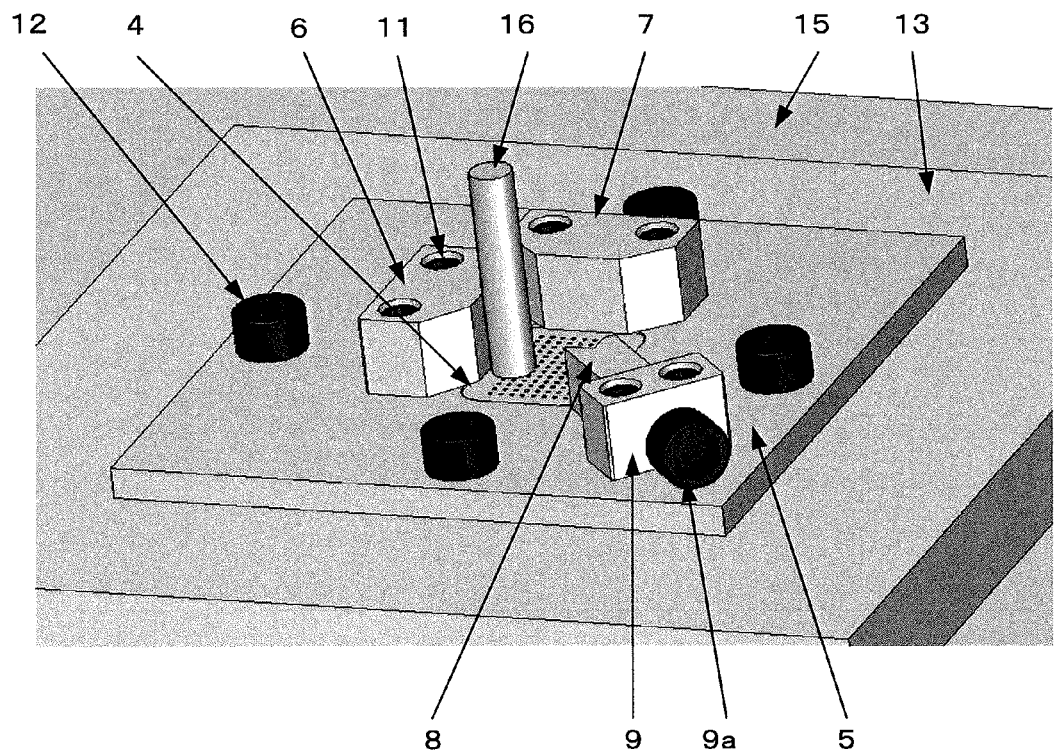
FIG. 3 is a view illustrating forming of a surface in the clamping jig.

FIG. 3 is a view illustrating forming of a surface in the clamping jig. First, the baseplate 5 for use as a constituent member of the workpiece clamping jig is secured to the vacuum suction table 13 on the table 15 of the machine tool by the bolts 12. The workpiece mounting surface 4 is formed on the surface of the baseplate 5 by a cutting tool 16 of the machine tool (not shown) controlled by a controller (not shown).

Then, the first and second fixed workpiece-abutting members 6 and 7 and the movable workpiece-abutting member 8 are secured to the baseplate 5 by the bolts 11. The fixed abutting surfaces 6a and 7a of the first and second fixed workpiece-abutting members 6 and 7 and the movable abutting surface 8a of the movable workpiece-abutting member 8 are formed using the cutting tool 16 by the machine tool controlled by the controller.

Thereafter, the workpiece 3 is set on the workpiece mounting surface 4 and clamped by the first and second fixed workpiece-abutting members 6 and 7 and the movable workpiece-abutting member 8. The clamped workpiece 3 is machined by using the cutting tool 16 of the machine tool or another cutting tool (not shown).

In the machining method described above, the workpiece mounting surface 4 is first formed by the cutting tool 16, the fixed and movable workpiece-abutting members 6, 7 and 8 are then secured to the baseplate 5 by the bolts 11, and the fixed abutting surfaces 6a and 7a are formed and shaped by the cutting tool 16. Alternatively, however, the abutting surfaces 6a, 7a and 8a of the fixed and movable workpiece-abutting members 6, 7 and 8 may be machined in one and the same process.

First, the baseplate 5 as a constituent member of the workpiece clamping jig is secured to the vacuum suction table 13 on the table 15 of the machine tool by the bolts 12. Thereafter, the fixed and movable workpiece-abutting members 6 to 8 are secured to the baseplate 5 by the bolts 11.

Then, in order to form the workpiece mounting surface 4 of the baseplate 5, the fixed abutting surfaces 6a and 7a of the first and second fixed workpiece-abutting members 6 and 7, and the movable abutting surface 8a of the movable workpiece-abutting member 8, forming operation is performed using the cutting tool 16 by the machine tool controlled by the controller.

Subsequently, the workpiece 3 is set on the workpiece mounting surface 4, clamped by the fixed workpiece-abutting members 6 and 7 and the movable workpiece-abutting member 8, and subjected to vacuum suction. The workpiece 3, thus clamped and secured by vacuum suction, is machined by using the cutting tool 16 of the machine tool or another cutting tool (not shown).

As described before, the workpiece mounting surface 4, fixed abutting surfaces 6a and 7a, and movable abutting surface 8a are formed after the member that constitutes the workpiece clamping jig is installed in the machine tool. By doing this, the workpiece 3 can be prevented from being lifted from the workpiece mounting surface 4 by clamping even if the workpiece mounting surface 4 and the abutting members 6 to 8 having the abutting surfaces 6a to 8a are not reliable in surface precision or mounting accuracy.

Figure 4:
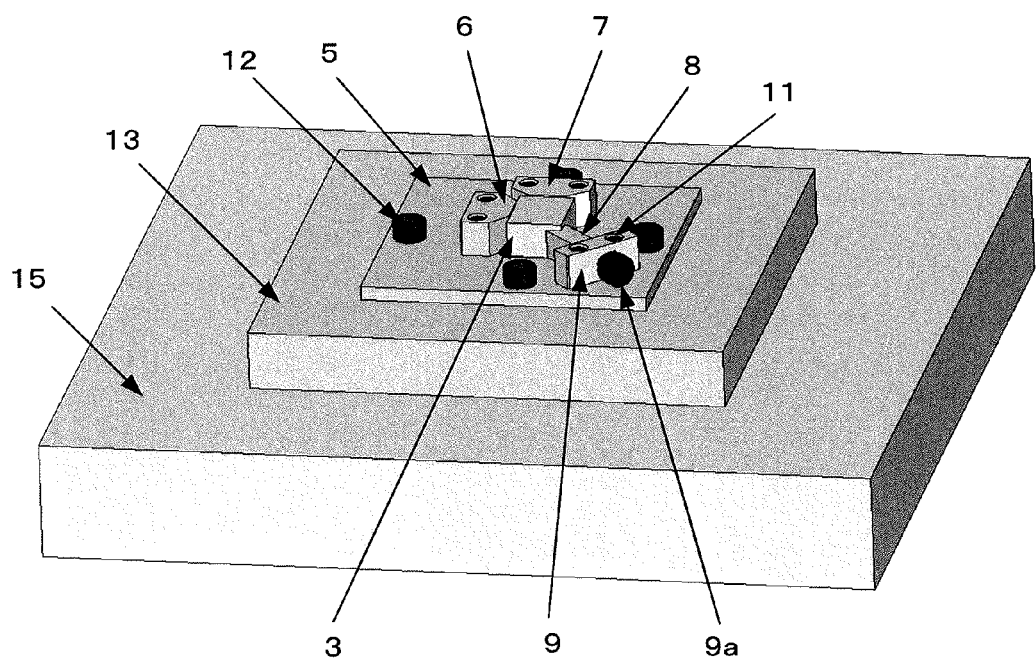
FIG. 4 is a perspective view illustrating the workpiece clamping jig set on a table of a machine tool.

FIG. 4 is a perspective view illustrating the workpiece clamping jig set on the table of the machine tool. As shown in FIG. 4, the workpiece 3 is secured to the clamping jig.

Figure 5:
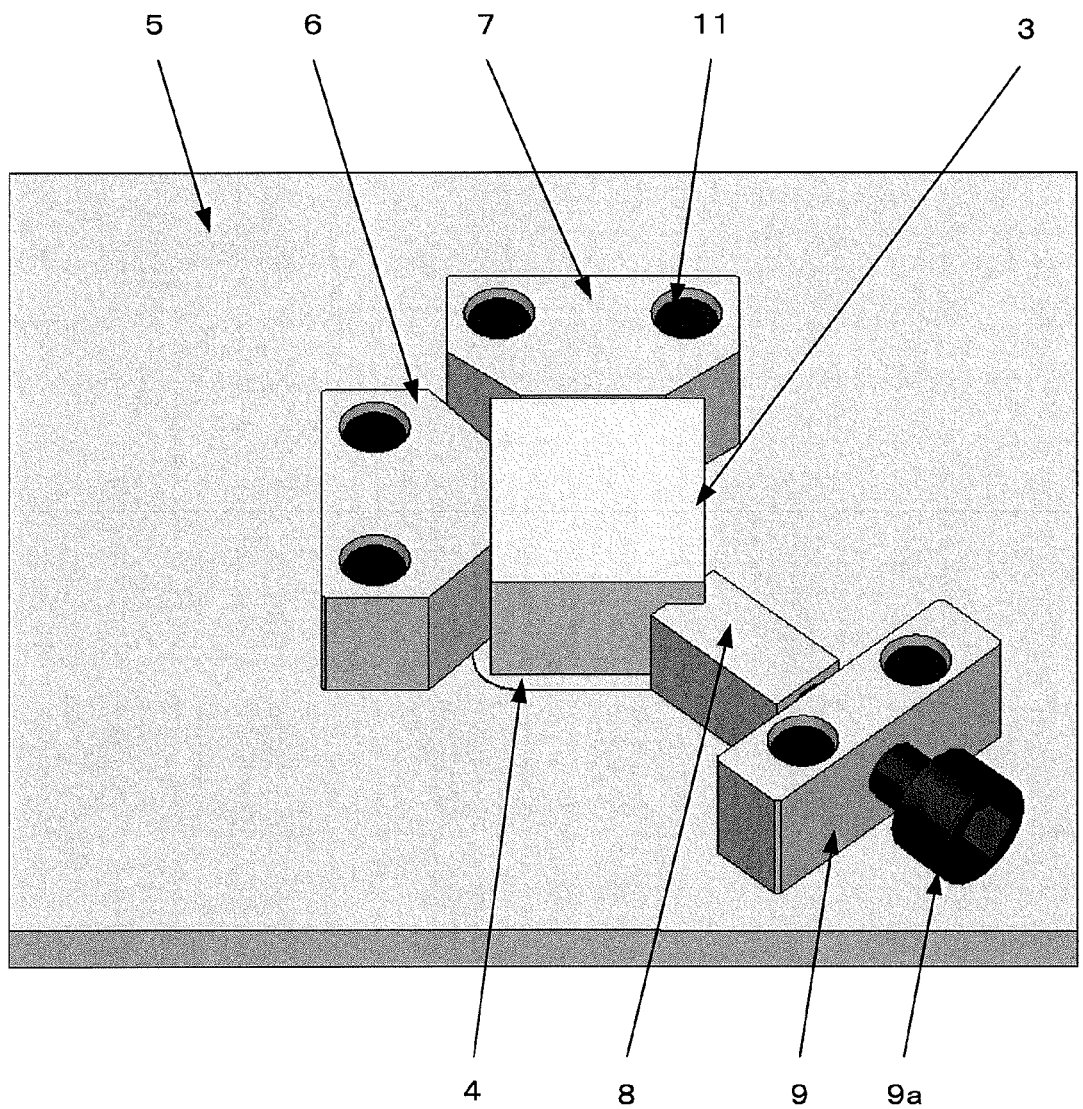
FIG. 5 is a perspective view illustrating the workpiece clamping jig clamping the workpiece.

FIG. 5 is a perspective view illustrating the clamping jig clamping the workpiece. As shown in FIG. 5, the first and second fixed workpiece-abutting members 6 and 7, which are secured to the periphery of the workpiece mounting surface 4, and the movable workpiece-abutting member 8 are individually secured to the top surface of the baseplate 5 by the bolts 11.

The workpiece 3 is set on the workpiece mounting surface 4 and the movable workpiece-abutting member 8 is moved toward the workpiece 3 by manually operating the screw 9a of the abutting means 9. The side surfaces of the workpiece 3 are caused to abut against the fixed abutting surfaces 6a and 7a of the first and second fixed workpiece-abutting members 6 and 7 and the movable abutting surface 8a of the movable workpiece-abutting member 8. In this way, the workpiece 3 is clamped by the clamping jig.

Figure 6:
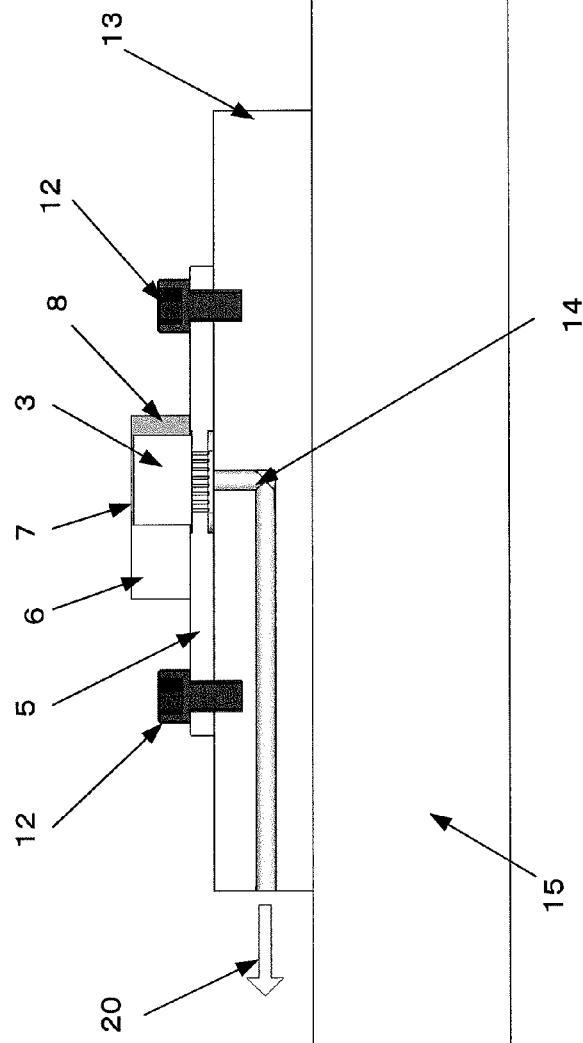
FIG. 6 is a sectional view illustrating the clamping jig set on the table of the machine tool shown in FIG. 4.
Figure 7:
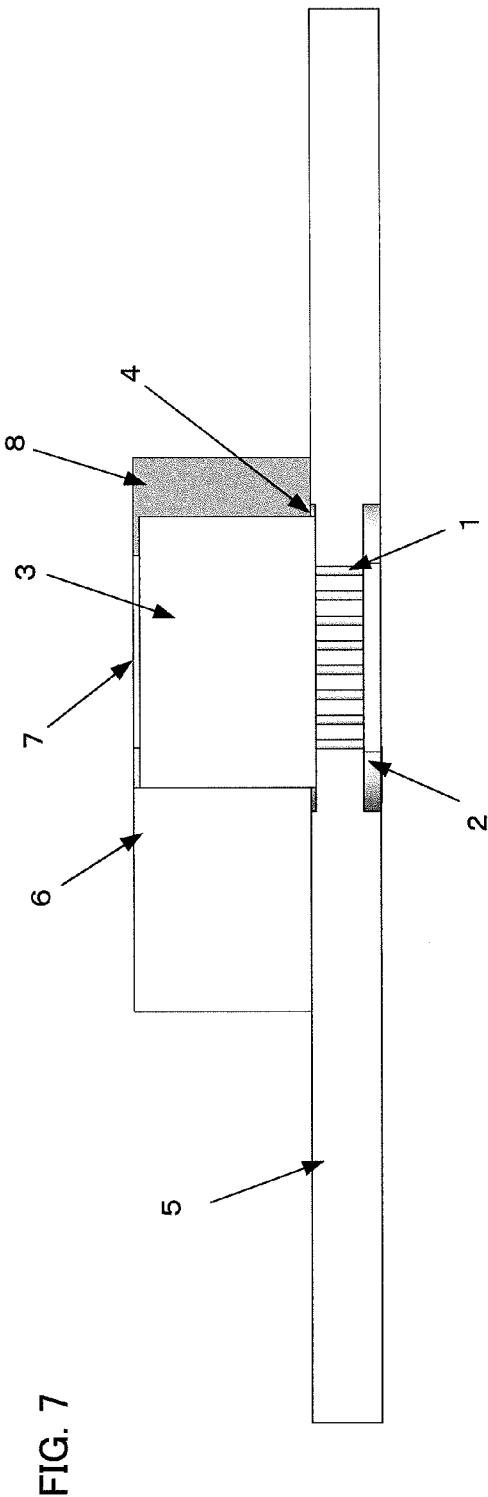
FIG. 7 is a partial sectional view illustrating the clamping jig shown in FIG. 6.

FIG. 6 is a sectional view illustrating the clamping jig set on the table of the machine tool shown in FIG. 4. FIG. 7 is a partial sectional view illustrating the clamping jig shown in FIG. 6.

The suction through-holes 1 are formed in that part of the workpiece mounting surface 4 of the baseplate 5 which contacts the whole or part of the bottom surface of the workpiece 3. On the other hand, the pocket 2 is formed on the reverse side of the workpiece mounting surface 4 of the baseplate 5 so as to cover the air intake port 14 in the vacuum suction table 13. Since the periphery of the pocket 2 is sealed by the baseplate 5, the vacuum suction table 13, and a gasket (not shown), the entire air intake passage except the suction through-holes 1 on the workpiece mounting surface 4 is closed. Intake air 20 discharged from the vacuum suction table 13 is guided to a vacuum device (not shown).

The shape of the workpiece 3 is not limited to a rectangular parallelepiped. In the case of a columnar workpiece, for example, the abutting surfaces of the fixed and movable workpiece-abutting members can be formed into curved surfaces with a curvature conforming to the workpiece shape. In this case, as in the case described above, for performing workpiece clamping, the workpiece mounting surface and the abutting surfaces of the abutting members, which contact the workpiece, are formed so that they conform to the shape of the workpiece. The workpiece is clamped with the workpiece clamping jig for performing machining of the workpiece while the workpiece clamping jig is installed on the machine tool. If those surfaces (bottom and side surfaces) of the workpiece which contact the workpiece clamping jig can be formed, moreover, the workpiece can be machined to easily conform to the shapes of the abutting surfaces of the workpiece-abutting members and to ensure high adhesion of its bottom surface.

According to the embodiment of the present invention described herein, the bottom surface of the workpiece 3 can be brought into close contact with the workpiece mounting surface 4, so that the top portion of the workpiece can be precisely machined. At the same time, high-load machining can be achieved by clamping by means of the workpiece-abutting members 6 to 8. Since the workpiece 3 is clamped sideways, it need not be pressed from above, and clamping margins of the workpiece to be discarded after machining can be eliminated.

After the workpiece clamping jig is installed in the machine tool, furthermore, the workpiece mounting surface 4 and the abutting surfaces of the workpiece-abutting members 6 to 8 are formed, so that the perpendicularity between the surfaces of these members and a surface shape conforming to the workpiece shape can be secured. Thus, the bottom surface of the workpiece 3 and the workpiece mounting surface 4 can be closely secured to each other even after clamping, so that the bottom surface portion of the workpiece can be precisely machined without being lifted.

The invention claimed is:

1. A workpiece machining method using a workpiece clamping jig, in which machining is performed on a workpiece held by vacuum suction and clamped by the workpiece clamping jig, the workpiece clamping jig comprising:
    a baseplate comprising a workpiece mounting surface carrying the workpiece on the top thereof, a pocket which forms an air intake passage on the reverse side of the workpiece mounting surface, and a suction through-hole internally connecting the workpiece mounting surface and the pocket;
    a fixed abutting member disposed on the baseplate and comprising a fixed abutting surface corresponding to the shape of the workpiece; and
    a movable abutting member comprising an abutting surface movable relative to the workpiece caused to abut against the fixed abutting surface,
the workpiece machining method comprising:
    setting the baseplate on a vacuum suction table set on a table of a machine tool;
    machining the workpiece mounting surface of the baseplate by use of the machine tool;
    installing the fixed abutting member and the movable abutting member on the baseplate;
    machining the respective abutting surfaces of the fixed and movable abutting members by use of the machine tool;
    setting the workpiece on the workpiece mounting surface and clamping the workpiece by use of the fixed and movable abutting members; and
    machining the clamped workpiece.

2. A workpiece machining method using a workpiece clamping jig, in which machining is performed on a workpiece held by vacuum suction and clamped by the workpiece clamping jig, the workpiece clamping jig comprising:
    a baseplate comprising a workpiece mounting surface carrying the workpiece on the top thereof, a pocket which forms an air intake passage on the reverse side of the workpiece mounting surface, and a suction through-hole internally connecting the workpiece mounting surface and the pocket;
    a fixed abutting member disposed on the baseplate and comprising a fixed abutting surface corresponding to the shape of the workpiece; and
    a movable abutting member comprising an abutting surface movable relative to the workpiece caused to abut against the fixed abutting surface,
the workpiece machining method comprising:
    setting the baseplate on a vacuum suction table set on a table of a machine tool;
    installing the fixed abutting member and the movable abutting member on the baseplate;
    machining the workpiece mounting surface of the baseplate and the respective abutting surfaces of the fixed and movable abutting members by use of the machine tool;
    setting the workpiece on the workpiece mounting surface and clamping the workpiece by use of the fixed and movable abutting members; and
    machining the clamped workpiece.

3. A workpiece clamping jig configured to clamp a workpiece, the workpiece clamping jig comprising:
    a baseplate comprising a workpiece mounting surface carrying the workpiece on the top thereof, a pocket which forms an air intake passage on the reverse side of the workpiece mounting surface, and a suction through-hole internally connecting the workpiece mounting surface and the pocket;
    a fixed abutting member disposed on the baseplate and comprising a fixed abutting surface corresponding to the shape of the workpiece; and
    a movable abutting member comprising an abutting surface movable relative to the workpiece caused to abut against the fixed abutting surface, wherein
    after mounting the workpiece clamping jig on a vacuum suction table set on a table of a machine tool, the workpiece mounting surface and the abutting surfaces of the fixed abutting member and the movable abutting member are configured to be machined by using the machine tool.

* * * * *